(12) United States Patent
Traverso et al.

(10) Patent No.: US 10,145,758 B2
(45) Date of Patent: Dec. 4, 2018

(54) WAFER LEVEL OPTICAL PROBING STRUCTURES FOR SILICON PHOTONICS

(71) Applicant: Cisco Technology, Inc., San Jose, CA (US)

(72) Inventors: Matthew J. Traverso, Santa Clara, CA (US); Ravi S. Tummidi, Breinigsville, PA (US); Mark A. Webster, Bethlehem, PA (US); Sandeep Razdan, Burlingame, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/582,306

(22) Filed: Apr. 28, 2017

(65) Prior Publication Data
US 2018/0313718 A1    Nov. 1, 2018

(51) Int. Cl.
| | | |
|---|---|---|
| *G01N 21/00* | (2006.01) | |
| *G01M 11/00* | (2006.01) | |
| *G02B 6/12* | (2006.01) | |
| *G02B 6/13* | (2006.01) | |
| *G02B 6/122* | (2006.01) | |

(52) U.S. Cl.
CPC ............... *G01M 11/30* (2013.01); *G02B 6/12* (2013.01); *G02B 6/13* (2013.01); *G02B 6/122* (2013.01); *G02B 2006/1213* (2013.01)

(58) Field of Classification Search
CPC ....... H01L 22/12; H01L 22/30; H01L 33/005; G01M 11/30; G01R 31/282; G01R 31/308; G02B 6/124; G02B 6/13
USPC .............. 356/237.1–237.5; 257/776; 438/16; 385/37, 14, 15, 27, 28, 31
See application file for complete search history.

(56) References Cited

U.S. PATENT DOCUMENTS

| | | | | |
|---|---|---|---|---|
| 7,262,852 B1 * | 8/2007 | Gunn, III | ........... | G02B 6/12007 |
| | | | | 250/559.4 |
| 9,459,177 B1 * | 10/2016 | Dong | ..................... | G01M 11/30 |

(Continued)

OTHER PUBLICATIONS

Stijn Scheerlincka, Dirk Taillaert, Dries Van Thourhout, and Roel Baets, "Flexible metal grating based optical fiber probe for photonic integrated circuits." Applied Physics Letters, vol. 92, Issue 3, 031104 (2008) (http://scitation.aip.org/content/aip/journal/apl/92/3/10.1063/1.2827589).

(Continued)

*Primary Examiner* — Hoa Pham
(74) *Attorney, Agent, or Firm* — Patterson + Sheridan, LLP

(57) ABSTRACT

Embodiments herein describe techniques for testing optical components in a photonic chip using a testing structure disposed in a sacrificial region of a wafer. In one embodiment, the wafer is processed to form multiple photonic chips integrated into the wafer. While forming optical components in the photonic chips (e.g., modulators, detectors, waveguides, etc.), a testing structure can be formed in one or more sacrificial regions in the wafer. In one embodiment, the testing structure is arranged near an edge coupler in the photonic chip such that an optical signal can be transferred between the photonic chip and the testing structure. Moreover, the testing structure has a grating coupler disposed at or near a top surface of the wafer which permits optical signals to be transmitted into, or received from, the grating coupler when an optical probe is arranged above the grating coupler.

19 Claims, 10 Drawing Sheets

(56) References Cited

U.S. PATENT DOCUMENTS

| | | | | |
|---|---|---|---|---|
| 2012/0104389 A1* | 5/2012 | Whitbread | ............. | G01M 11/00 257/48 |
| 2012/0250007 A1* | 10/2012 | Na | ......................... | G01M 11/00 356/73.1 |
| 2014/0205234 A1* | 7/2014 | Rong | ................... | G02B 6/4201 385/28 |
| 2016/0109659 A1* | 4/2016 | Jiang | ...................... | G02B 6/305 385/14 |
| 2017/0082799 A1* | 3/2017 | Novack | .................. | G02B 6/124 |
| 2017/0115458 A1* | 4/2017 | Mekis | .................. | G02B 6/4208 |

OTHER PUBLICATIONS

J. De Coster, et al. "Test-station for flexible semi-automatic wafer-level silicon photonics testing." 21st IEEE European Test Symposium (2016) 978-1-4673-9659 (<https://www.cascademicrotech.com/files/Test-stationforflexiblesemi-automaticwafer-levelsiliconphotonicstesting_SWTW2016_IEEE.pdf>).

Alex Behfar, "Reducing Test Costs for Silicon Photonics." May 23, 2014, 4 pgs. <http://www.edn.com/design/test-and-measurement/4430327/Reducing-test-costs-for-silicon-photonics>.

R. Baets et al. "Silicon Photonics: From Research to Manufacturable Products." 7 pgs., Photonics—2008 International Conference on Fibre Optics and Photonics, Dec. 13-17, 2008. <http://www.photonics.intec.ugent.be/download/pub_2372.pdf>.

Tom Baehr-Jones et al. "A 25 Gb/s Silicon Photonics Platform," Mar. 4, 2012, 13pgs., Cornell University Library, arXiv.org > physics > arXiv:1203.0767v1. https://arxiv.org/pdf/1203.0767.pdf.

\* cited by examiner

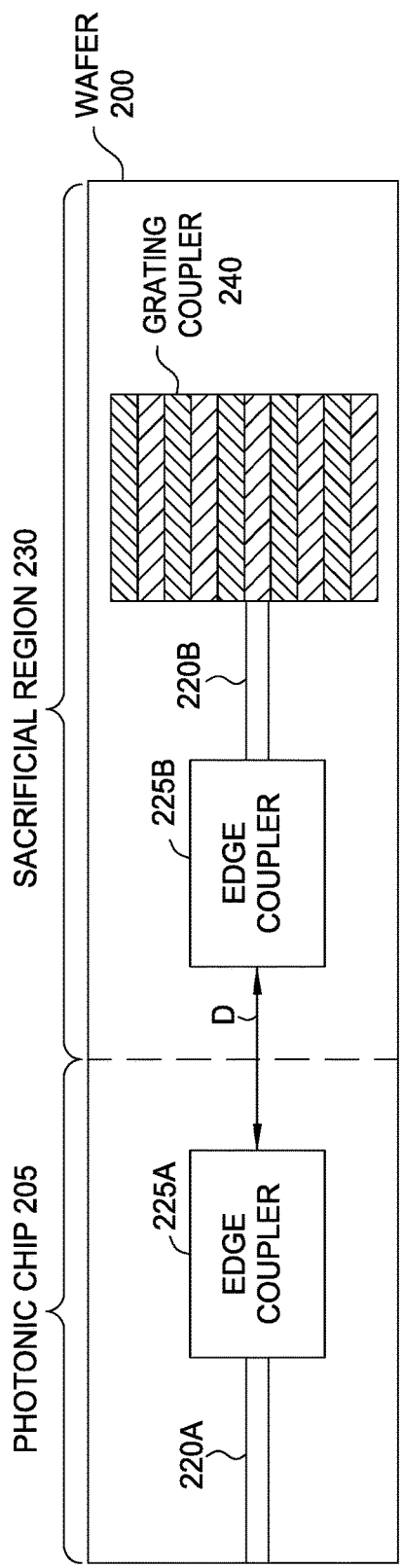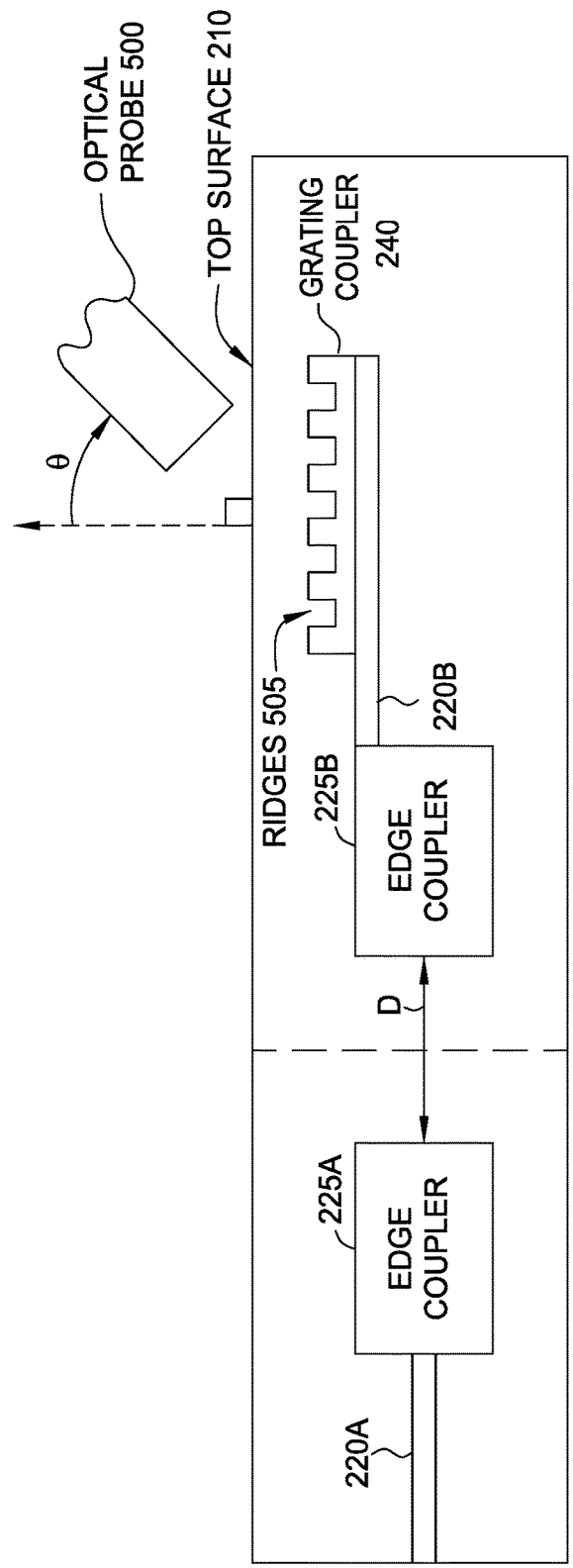

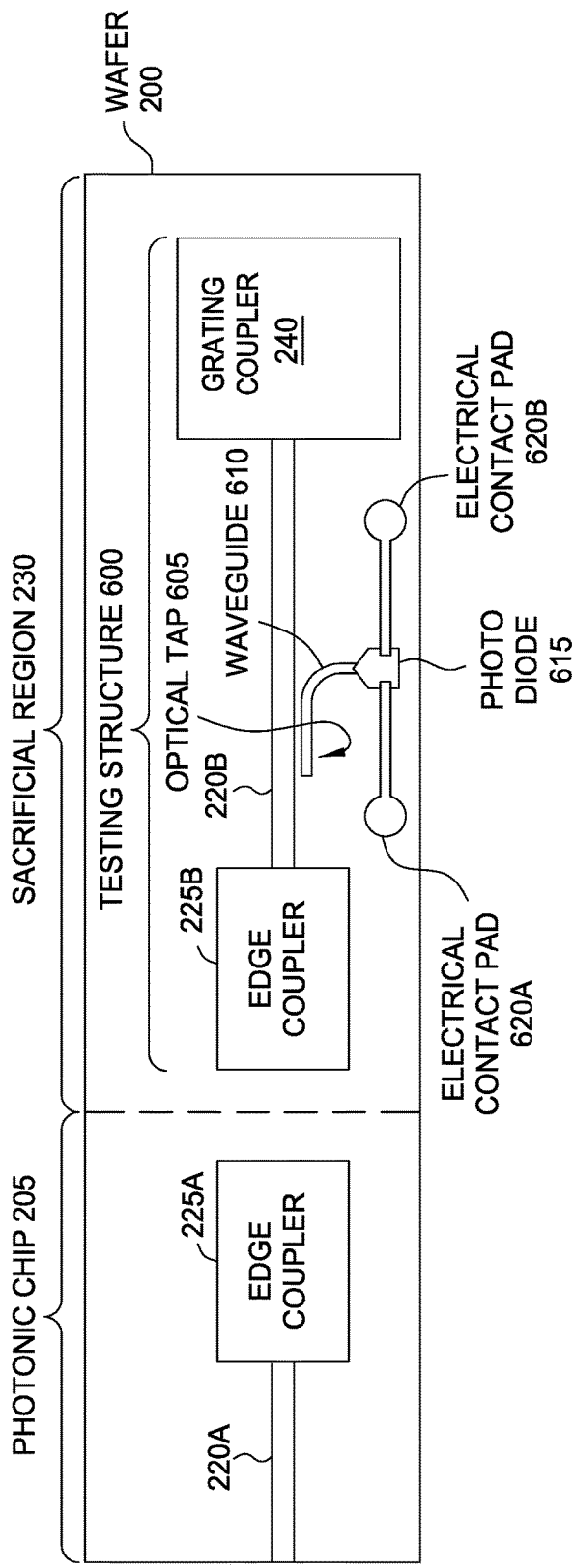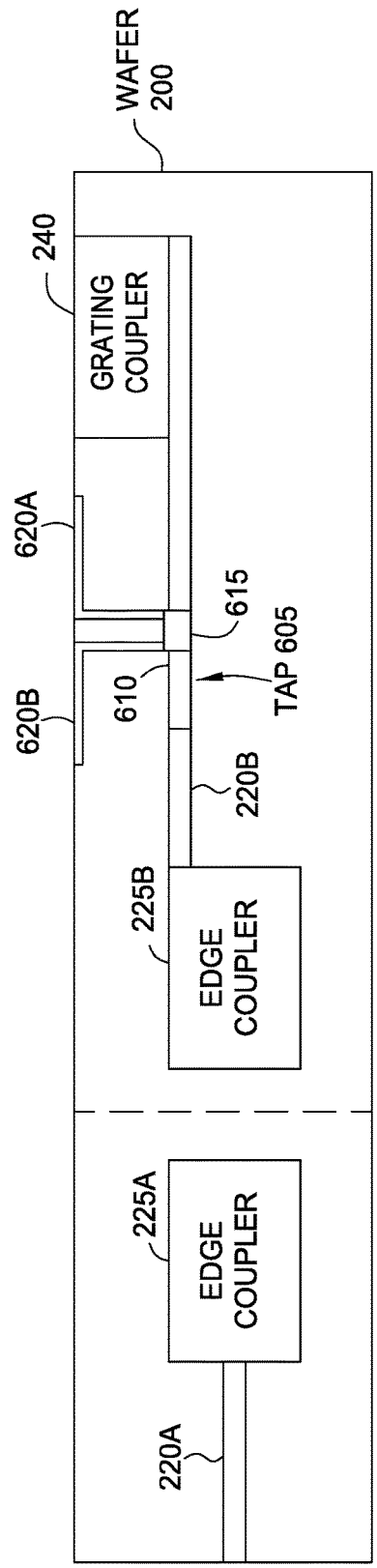
FIG. 6A
FIG. 6B

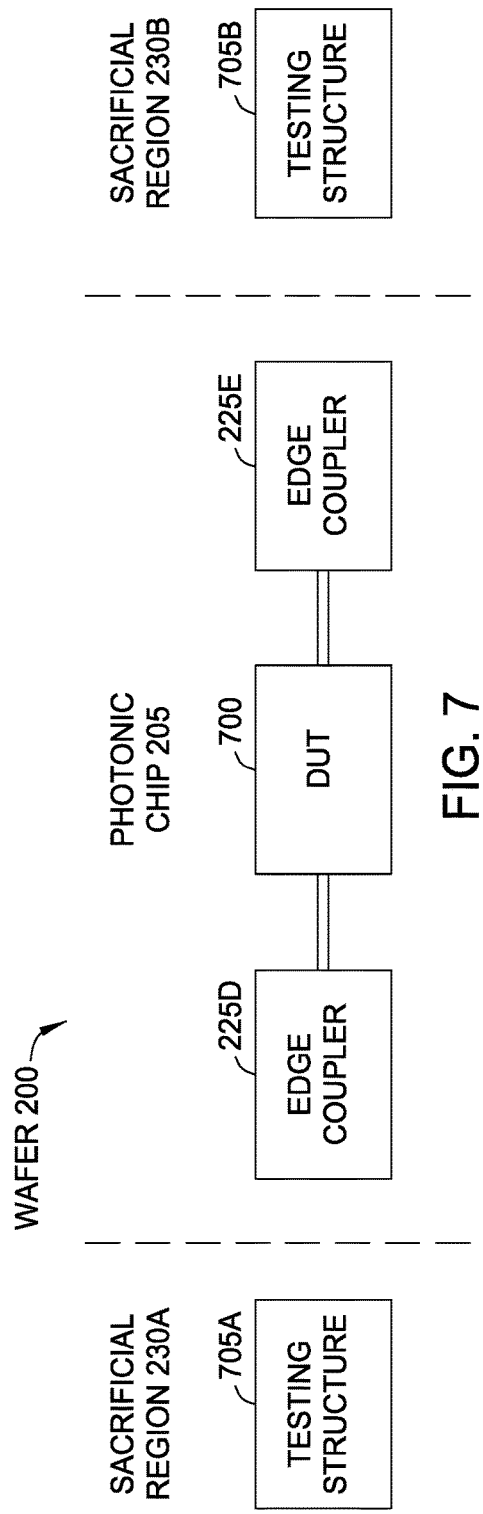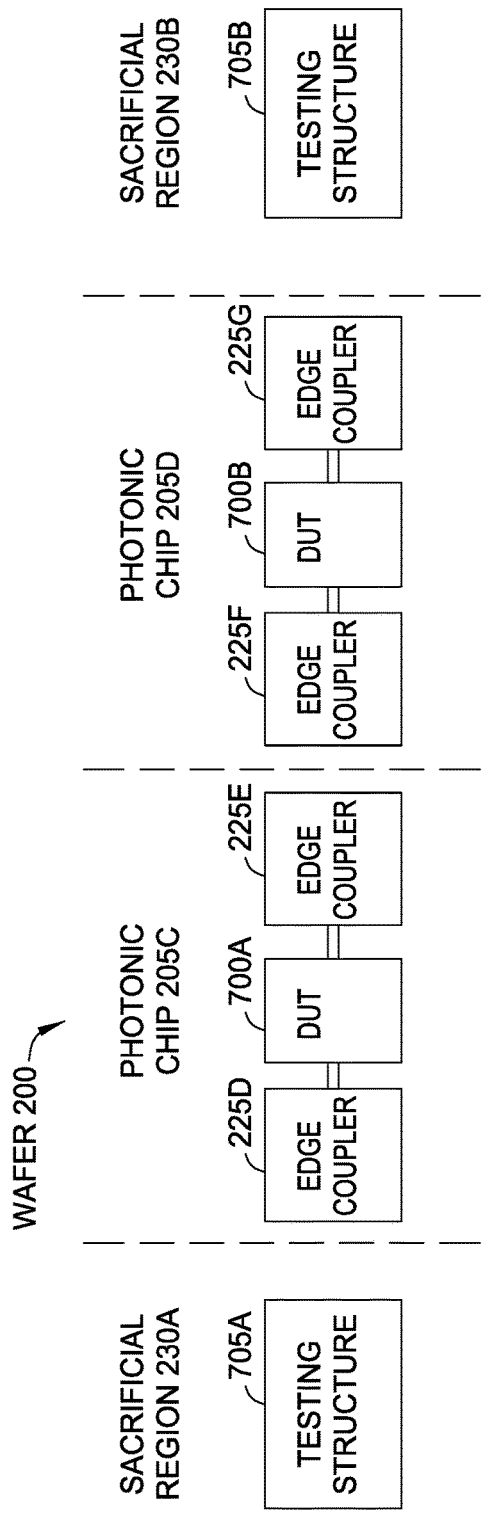

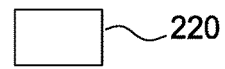
FIG. 10C    FIG. 10D
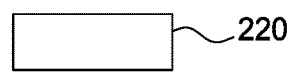
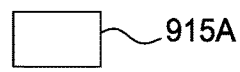
FIG. 10E
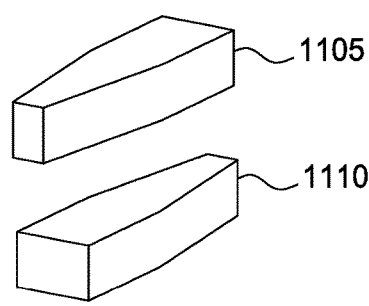
FIG. 11A    FIG. 11B

WAFER LEVEL OPTICAL PROBING STRUCTURES FOR SILICON PHOTONICS

TECHNICAL FIELD

Embodiments presented in this disclosure generally relate to photonic devices, and more specifically, to testing photonic chips integrated into a wafer.

BACKGROUND

Photonic chips can include optical interfaces to permit optical signals to be received from an optical source (e.g., a laser or an optical fiber) or transmitted to an optical fiber or detector. Some photonic chips include grating couplers disposed at the top of the photonic chip. However, grating couplers are complicated to manufacture (e.g., may require gray scale lithography) and take up significant amount of space on the photonic wafer.

Edge couplers can be disposed at the sides of the photonic chip and are easier to manufacture and provide better optical coupling than grating devices. However, when a wafer is being processed, the edge couplers are typically inaccessible until the wafer is diced to separate the wafer into a plurality of photonic chips. As such, the edge couplers cannot be coupled to optical probes in order to test the optical components in the wafer until the wafer has been separated into individual photonic chips.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 5A and 5B illustrate side and top views of a testing structure in a sacrificial region of a wafer, according to one embodiment disclosed herein.

FIGS. 6A and 6B illustrate side and top views of a testing structure in a sacrificial region of a wafer, according to one embodiment disclosed herein.

FIG. 7 illustrates a wafer with multiple testing structures optically coupled to a photonic chip, according to one embodiment disclosed herein.

FIG. 8 illustrates a wafer with photonic chips that are optically cascaded, according to one embodiment disclosed herein.

FIGS. 10A-10E illustrate different cross sectional views of the edge coupler in FIG. 9, according to one embodiment disclosed herein.

FIGS. 11A and 11B illustrate a tapered waveguide, according to one embodiment disclosed herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
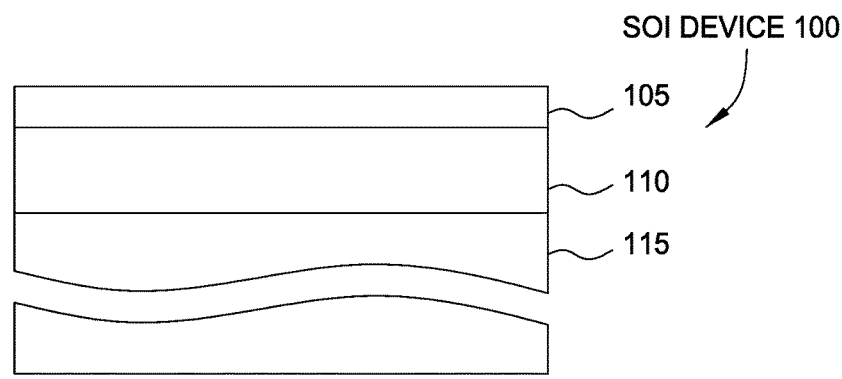
FIG. 1 illustrates a SOI device, according to one embodiment disclosed herein.

One embodiment presented in this disclosure is a method that includes providing a first testing structure in a sacrificial region of a wafer where the wafer includes a plurality of photonic chips, and wherein the first testing structure includes a first edge coupler optically coupled to a second edge coupler in a first photonic chip of the plurality of photonic chips. The method includes testing a first optical component in the first photonic chip using a first grating coupler in the first testing structure by transmitting a first optical signal between a first optical probe and the first optical component using the first grating coupler and the first and second edge couplers and removing the sacrificial region from the wafer such that the second edge coupler is optically exposed at a side surface of the first photonic chip.

Another embodiment presented herein is a semiconductor wafer that includes a sacrificial region comprising a first testing structure where the first testing structure includes a first edge coupler optically coupled to a first grating coupler configured to permit an optical signal to be at least one of transmitted to and received from an optical probe and a plurality of photonic chips integrated into the wafer where a first photonic chip of the plurality of photonic chips includes a second edge coupler and a first optical component. The first optical component, the first edge coupler, the second edge coupler, and the first grating coupler are optically coupled together such that the optical signal tests the functionality of the first optical component. Moreover, the first edge coupler is arranged in the first photonic chip such that the first edge coupler is optically exposed on a side surface of the first photonic chip after the first photonic chip has been separated from the other photonic chips in the wafer and the sacrificial region.

Another embodiment presented herein is a method that includes providing a first testing structure in a sacrificial region of a wafer where the wafer includes a plurality of photonic chips. Further, the first testing structure includes a first grating coupler and a first photonic chip of the plurality of photonic chips includes a first edge coupler optically coupled to a first optical component in the photonic chip and the first grating coupler. The method also includes testing, while the first photonic chip is part of the wafer, the first optical component using the first grating coupler in the first testing structure by transmitting a first optical signal between a first optical probe and the first optical component using the first grating coupler and the first edge coupler and removing the sacrificial region from the wafer such that the first edge coupler is optically exposed at a side surface of the first photonic chip.

Example Embodiments

Embodiments herein describe techniques for testing optical and/or electro-optic components in a photonic chip using a testing structure disposed in a sacrificial region of a wafer. In one embodiment, the wafer is processed to form multiple photonic chips (e.g., 20-200 chips) integrated into the wafer. While forming optical components in the photonic chips (e.g., modulators, detectors, waveguides, etc.), a testing structure can be formed in one or more sacrificial regions in the wafer. In one embodiment, the testing structure is arranged near an edge coupler in the photonic chip such that an optical signal can be transferred between the photonic chip and the testing structure.

In one embodiment, the testing structure has a grating coupler disposed at, or near, a top surface of the wafer which permits optical signals to be transmitted into, or received from, the grating coupler when an optical probe is aligned above the grating coupler. The testing structure can also include an edge coupler that is optically coupled to the grating coupler as well as an edge coupler in the photonic chip. Optical signals can be transmitted from the optical probe into the grating coupler, from the grating coupler to the edge coupler in the testing structure, and from the edge coupler in the testing structure to the edge coupler in the photonic chip. Conversely, optical signals can be transmitted from the edge coupler in the photonic chip to the edge coupler and the grating coupler in the testing structure and then into the optical probe. In this manner, optical components in the photonic chip can be tested using an edge coupler even while the photonic chip is integrated into a wafer.

Once testing is completed using the testing structure, the wafer can be etched or diced to remove the sacrificial region and to separate the plurality of photonic chips into individual chips. When doing so, the edge coupler is optically exposed at a side or edge of the photonic chip that is perpendicular (or substantially perpendicular) to the top surface of the wafer. Once separated, the edge coupler in photonic chip can then be aligned to an external optical device (e.g., an optical fiber or laser) which may be used for normal operation.

FIG. 1 illustrates a (silicon-on-insulator) SOI device 100, according to one embodiment disclosed herein. The SOI device 100 includes a surface layer 105, a buried insulation layer 110 (also referred to as buried oxide (BOX) layer), and a semiconductor substrate 115. Although the embodiments herein refer to the surface layer 105 and substrate 115 as silicon, the disclosure is not limited to such. For example, other semiconductors or optically transmissive materials may be used to form the structure shown here. Moreover, the surface layer 105 and the substrate 115 may be made of the same material, but in other embodiments, these layers 105, 115 may be made from different materials.

The thickness of the surface layer 105 may range from less than 100 nanometers to greater than a micron. More specifically, the surface layer 105 may be between 100-300 nanometers thick. The thickness of the insulation layer 110 may vary depending on the desired application. In one embodiment, the thickness of insulation layer 110 may range from less than one micron to tens of microns. The thickness of the substrate 115 may vary widely depending on the specific application of the SOI device 100. For example, the substrate 115 may be the thickness of a typical semiconductor wafer (e.g., 100-700 microns) or may be thinned and mounted on another substrate.

For optical applications, the silicon surface layer 105 and insulation layer 110 (e.g., silicon dioxide, silicon nitride, silicon oxy-nitride, and the like) may provide contrasting refractive indexes that confine an optical signal in a silicon waveguide in the surface layer 105. In a later processing step, the surface layer 105 may be etched to form one or more silicon waveguides. Because silicon has a higher refractive index compared to an insulator such as silicon dioxide, the optical signal remains primarily in the waveguide as it propagates across the surface layer 105.

Figure 2:
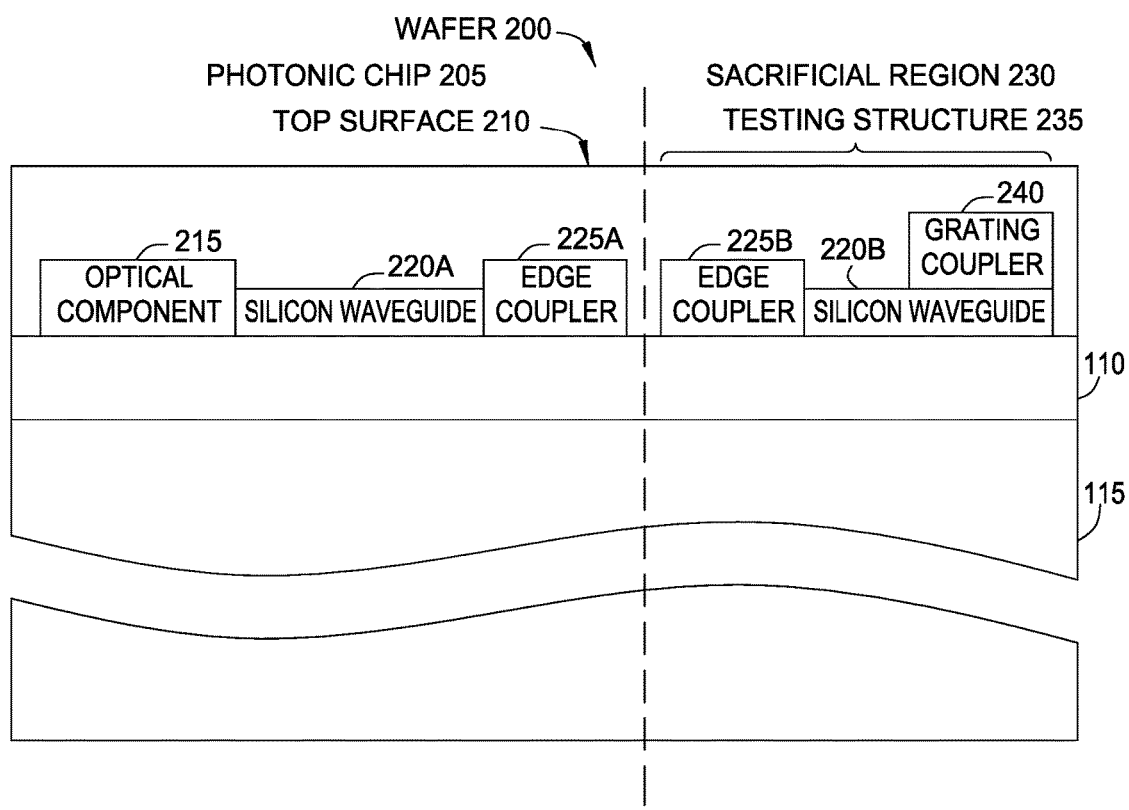
FIG. 2 illustrates a wafer that includes a testing structure for testing an optical component in a photonic chip, according to one embodiment disclosed herein.

FIG. 2 illustrates a wafer 200 that includes a testing structure 235 for testing an optical component 215 in a photonic chip 205, according to one embodiment disclosed herein. As shown, the wafer 200 is divided into two portions by the dotted line: the photonic chip 205 and the sacrificial region 230. As described in more detail below, the wafer 200 is cleaved or diced along the dotted line to separate the sacrificial region 230 from the photonic chip. However, before doing so, the testing structure 235 is used to test an optical component 215 in the photonic chip 205. That is, before the wafer 200 is separated into individual photonic chips, the testing structure 235 is used to test the function of the photonic chip 205. In that way, the manufacturer can identify which photonic chips 205 in the wafer 200 are functional and which are not. The non-functional photonic chips 205 (i.e., any chips that do not operate within predefined standards when being tested) can be discarded or sold at a discount. Moreover, identifying non-functional photonic chips 205 when still integrated into the wafer means the manufacture does not need to package the photonic chip which in some cases, costs more than fabricating the chips in order to determine if the photonic chip 205 is functional.

The photonic chip 205 and the sacrificial region 230 include the insulation layer 110 and the substrate 115. However, the surface layer has been processed to include various optical structures. In this example, the photonic chip 205 includes an optical component 215 coupled to an edge coupler 225A via a silicon waveguide 220A. The optical component 215 may be formed by performing various fabrication steps on the silicon layer such as etching or doping the silicon material as well as depositing or growing additional materials. Although not shown, the optical component 215 may be electrically connected to a top surface of the layer by a conductive pad and electrical vias. For example, the optical component 215 may be an optical modulator that is controlled by electrical data signals received from an external source for controlling the modulation of optical signals. In one embodiment, the optical modulator may modulate an optical signal received from the edge coupler 225, or alternatively, may be coupled to a laser (not shown) in the photonic chip 205 which outputs a continuous wave (CW) optical signal that is emitted by the modulator before being transmitted to the edge coupler 225A.

On the other hand, if the optical component 215 is an optical detector, the detector may have n-type and p-type doped regions coupled to respective conductive pads at the top surface 210 for receiving or transmitting electrical signals that correspond to the absorbed optical signal received from the silicon waveguide 220A.

Although not shown, after the photonic chip 205 is separated from the wafer 200, the conductive pads at the top surface 210 may be connected to an electrical integrated circuit (IC) that receives electrical signals from, or transmits electrical signals to, the optical component 215. In one embodiment, the electrical IC is physically separate from the photonic chip 205 but couples to the top surface 210 via a bond wire and/or a bus. In another embodiment, the logic in the electrical IC is formed in the same SOI structure of the photonic chip 205. Thus, instead of using a conductive pad, the optical component 215 can transmit and receive a data signal to the logic using an internal trace or wire.

The silicon waveguides 220A and 220B may be fabricated from a silicon surface layer (e.g., layer 105 of FIG. 1). The photonic chip 205 uses the waveguide 220A to carry an optical signal to different areas of the surface layer. In this example, the silicon waveguide 220A transmits optical signals between the edge coupler 225A and the optical component 215.

As shown, one interface of the edge coupler 225A is coupled to the waveguide 220A while another interface is proximate to an edge couple 225B in the testing structure 235. In this embodiment, the edge couplers 225 do not directly abut but are instead separated by a dielectric material—e.g., silicon dioxide. In one embodiment, the edge couplers 225 are made of the same material as the waveguides 220. For example, the edge couplers 225 and the waveguides 220 may both be made of silicon. In one embodiment, the edge couplers 225 are formed from silicon nitride or silicon oxy-nitride while the waveguides 220 are formed from crystalline silicon.

The edge coupler 225A may be designed to efficiently couple to an external light-carrying medium (e.g., a laser or fiber optic cable). Because the dimensions of the silicon waveguides 220 may result in high optical losses if directly connected to the external light-carrying medium, the light-carrying medium may instead be coupled to the edge coupler 225A which then transfers the signal into the silicon waveguide 220A. Doing so may eliminate the need for using lenses between the external light-carrying medium and the waveguide 220A which focus the optical signal into a mode with a diameter similar to the dimensions of the waveguide 220A. Stated differently, in one embodiment, the edge coupler 225A permits the external light-carrying medium to be butt-coupled to a side surface of the photonic chip 205 (after the chip 205 has been separated from the sacrificial region 230) and transmit light directly into photonic chip 205 without the addition of external focusing elements such as lenses.

In one embodiment, the edge couplers 225A are formed from at least one tapered waveguide where the width of the waveguide varies as the edge couplers 225 extend away from each other. As described in more detail below, the edge couplers 225 may include a plurality of stacked layers that are processed (e.g., etched) such that an optical signal transmitted between the edge couplers 225 is focused into a respective one of the waveguides 220.

The edge coupler 225B in the testing structure 235 is coupled to a grating coupler 240 via the silicon waveguide 220B. As describe in more detail below, the grating coupler 240 permits the optical component 215 in the photonic chip 205 to be tested before the wafer 200 has been processed in order to expose the edge coupler 225A at a side surface. An optical signal can be transmitted into the grating coupler 240, which is then forwarded to the optical component 215 through the waveguides 220 and edge couplers 225. Alternatively, the optical signal can be received from the grating coupler 240 at a testing apparatus in response to the optical component 215 emitting an optical signal into the silicon waveguide 220A.

Figure 3:
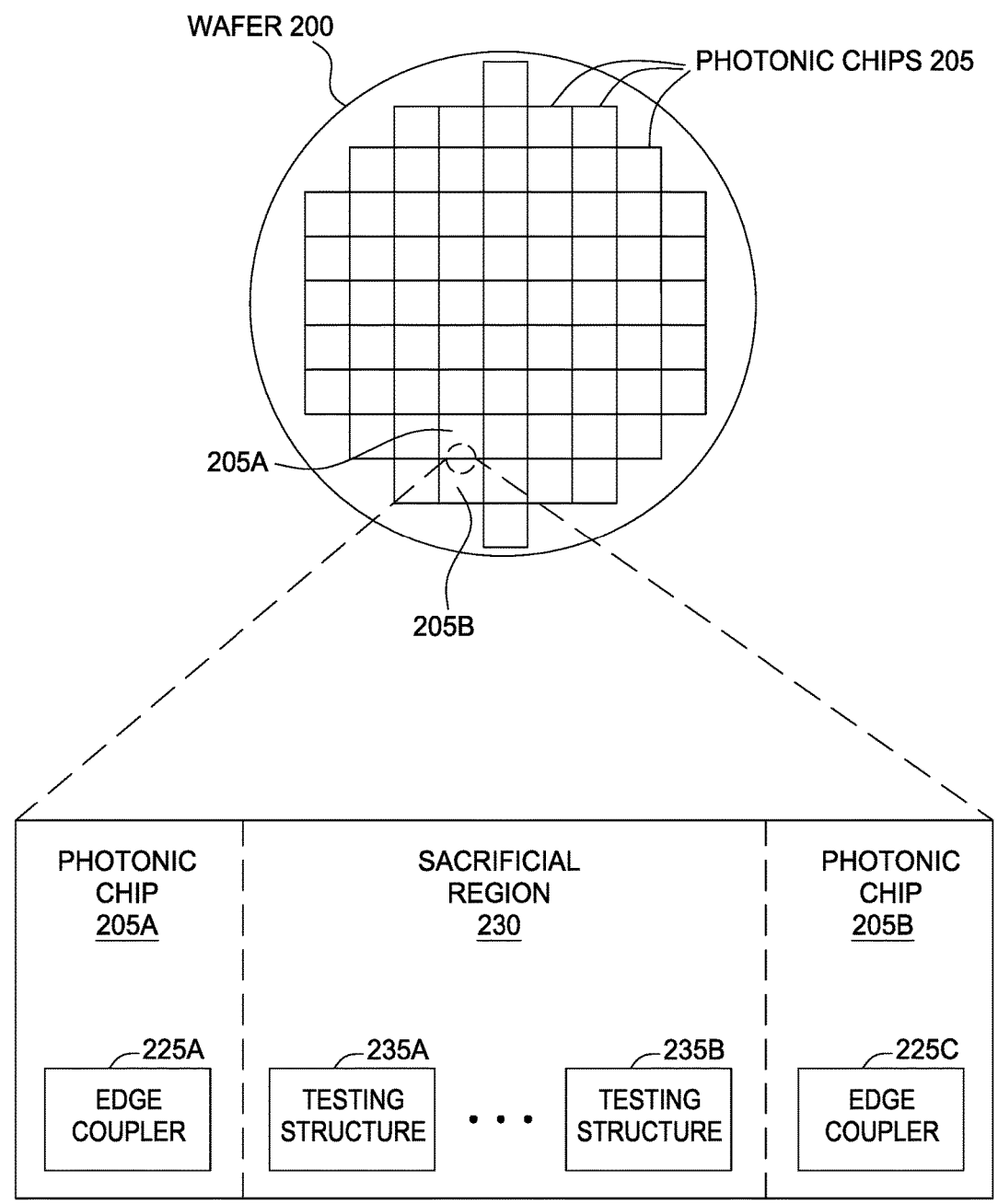
FIG. 3 illustrates a wafer that includes a sacrificial region used for testing the photonic chips, according to one embodiment disclosed herein.

FIG. 3 illustrates a top view of a wafer 200 that includes a sacrificial region 230 used for testing the photonic chips 205, according to one embodiment disclosed herein. As shown, the wafer 200 includes a plurality of rectangular shaped photonic chips 205 (e.g., from 10-200 chips). Instead of forming a single photonic chip 205 at a time, the wafer 200 permits the same fabrication steps to be used to form multiple photonic chips 205 in parallel. Moreover, as shown by the blow up region, the wafer 200 includes a sacrificial region 230 between photonic chip 205A and 205B. In one embodiment, the wafer 200 may include the sacrificial region 230 between all the photonic chips, or the region 230 may be added at only one or two sides of the photonic chips 205. On the other sides, the photonic chip 205 may directly border a neighboring photonic chip 205. The sacrificial region 230 provides area on the wafer 200 for disposing the testing structures 235. In addition to placing the testing structures 235 between the photonic chips 205, the testing structures may also be disposed in the regions in the wafer 200 between the outer photonic chips 205 and the edge of the wafer 200.

The blow up circle in FIG. 3 illustrates the sacrificial region 230 disposed between the photonic chip 205A and the photonic chip 205B. The region 230 includes two testing structures 235 which are respectively coupled to edge couplers 225 in the photonic chips 205. In this example, the edge coupler 225A is optically coupled to the testing structure 235A while the edge coupler 225C is optically coupled to the testing structure 235B. In one embodiment, a single testing structure 235 may be used to test optical components in multiple photonic chips 205. For example, the testing structure 235 may include a grating coupler that is coupled to a splitter. By introducing a testing signal into the grating coupler, that signal can be split into both the edge coupler 225A in the photonic chip 205A and the edge coupler 225B in the photonic chip 205B.

In later processing steps, the wafer 200 is diced or sawed to separate the photonic chips 205. When doing so, the sacrificial region 230 is removed from the photonic chips 205. For example, the wafer 200 can be diced along the dotted lines shown in FIG. 3 in order to remove the sacrificial region from the photonic chips 205. In another embodiment, an etching process or a combination of etching and dicing is used to remove the sacrificial region 230 (e.g., a dry reactive ion etch (DRIE)). After separating the photonic chips 205, the edge couplers 225 can be coupled to an external optical device such as a laser or optical fiber during a packaging process. Put differently, the edge couplers 225 can be dual purposed to transmit optical signals during a testing stage when the photonic chips 205 are integrated into the wafer 200 and during a normal operation stage when the photonic chips 205 have been packaged and coupled to external optical devices.

Figure 4:
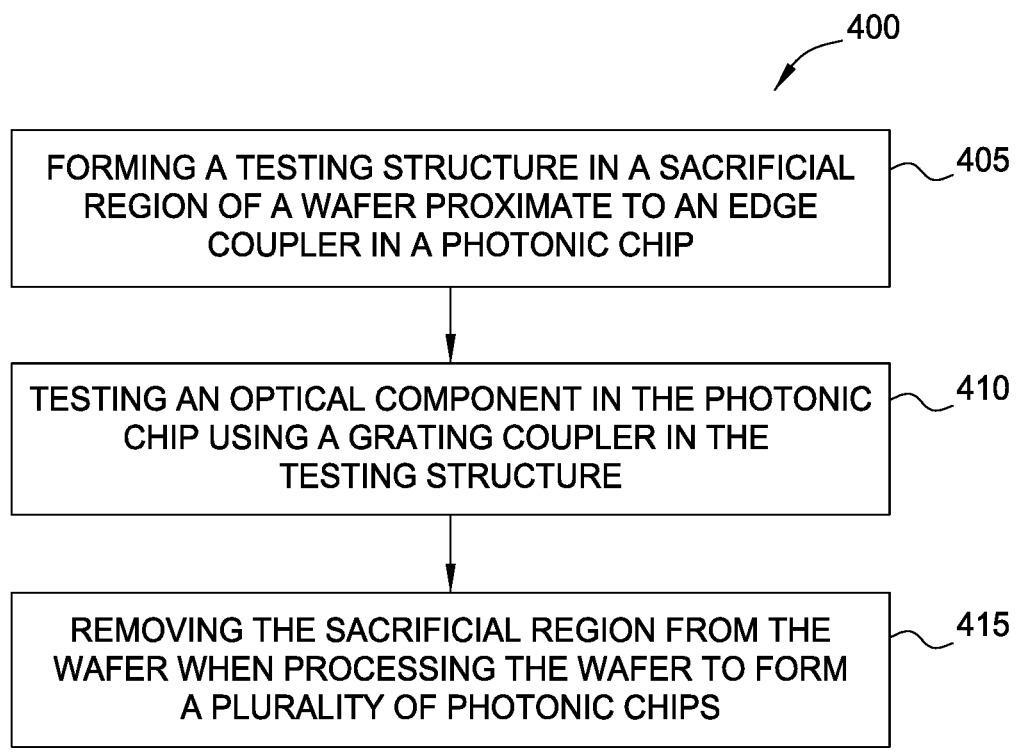
FIG. 4 is a flowchart for testing a photonic chip using edge couplers while the photonic chip is integrated into a wafer, according to one embodiment disclosed herein.

FIG. 4 is a flowchart of a method 400 for testing a photonic chip using edge couplers while the photonic chip is integrated into a wafer, according to one embodiment disclosed herein. At block 405, a testing structure is formed in a sacrificial region of a wafer proximate to an edge coupler in a photonic chip. In one embodiment, the testing structure is formed in parallel with the photonic chip. For example, the testing structure and the photonic chip may both include optical components (e.g., waveguides, couplers, modulators, detectors, etc.) that are formed using the same fabrication steps or processes. However, in another embodiment, the one or more components of the testing structure are formed using different process steps than the photonic chip. For example, the photonic chip may not include a grating coupler, and thus, the grating coupler in the testing structure may be formed separately from structures in the photonic chip when processing the wafer.

In one embodiment, the testing structure includes a grating coupler configured to transmit light through a top surface of the wafer. That is, the grating coupler permits light to be transmitted vertically through the top surface. The grating coupler is optically coupled to an edge coupler via a waveguide which transmits light laterally through the wafer. In one embodiment, the edge coupler in the testing structure is aligned with an edge coupler in the photonic chip such that optical signals can be transmitted between the two edge couplers. In one embodiment, the edge coupler in the testing structure may have the same arrangement and dimensions as the edge coupler in the photonic chip although this is not a requirement. Further, the edge couplers may also be made from the same material, e.g., crystalline silicon, silicon nitride, or silicone oxy-nitride.

At block 410, a technician tests an optical component in the photonic chip using the grating coupler in the testing structure. To do so, the technician (or a testing apparatus) moves an optical probe into optical communication with the grating coupler. In one embodiment, the technician may use an alignment apparatus in order to ensure the optical probe has an optimal angle relative the grating coupler so that optical signals can be transferred through the top surface of the wafer. In another embodiment, an alignment apparatus may be formed on the surface of the wafer to ensure the proper angle between the optical probe and the grating coupler.

In one embodiment, the optical probe transmits optical signals into the grating coupler and the testing structure provides an optical path for propagating the optical signals into the photonic chip. Referring to FIG. 2, the optical path includes the grating coupler 240, the silicon waveguide 220B, and the edge coupler 225B. Once the optical signal is received at the edge coupler 225A in the photonic chip 205, the signal can be routed to the optical component 215. In one embodiment, the photonic chip may route a signal generated by the optical component in the photonic chip to another testing structure coupled to a second optical probe. Depending on the signal received by the second optical probe, the technician can determine whether the optical component is functioning within satisfactory thresholds. For example, if the optical component is a modulator, the technician may use one testing structure to introduce a CW or modulated optical signal into the photonic chip and use a second testing structure to receive an output optical signal generated by the modulator. In parallel, electrical probes can be coupled to the wafer to provide electrical signals that control the modulation of the optical signals. In this manner, the modulator in the photonic chip can be tested before the wafer has been diced and separated into individual chips.

In another embodiment, the optical component may be a laser in the photonic chip. The laser can be powered by using electrical pads exposed at the top surface of the wafer. The output of the laser can be coupled via an edge coupler to the testing structure in the sacrificial region which is in turn coupled to an optical probe and a testing apparatus. By evaluating the signal received on the optical probe, the technician can ensure the laser is functioning as desired.

In another example, the testing structures can test the optical attenuation of an optical path in the photonic chip. The technician can use one of the testing structures to introduce an optical signal into a first end of the optical path in the photonic chip and use a second testing structure to receive optical signals at a second end of the optical path. Comparing the transmitted optical signal to the received optical signal indicates the total attenuation of the optical path which can be compared to a predefined threshold to indicate if the photonic chip has satisfactory performance.

At block 415, the sacrificial region is removed from the wafer when processing the wafer to form a plurality of photonic chips. In one embodiment, the wafer is sawed or diced at a boundary between the photonic chip and the sacrificial region. In another embodiment, the photonic chip may be masked while the sacrificial region is etched (e.g., DRIE) to remove the testing structure from the wafer.

In another embodiment, a combination of etching and dicing is used to remove the sacrificial region. An etching process can be used to form a trench between the edge coupler in the sacrificial region and the edge coupler in the photonic chip. Using FIG. 2 as a reference, an interlayer dielectric (ILD) etch can be used to remove insulative material between the edge coupler 225A and the edge coupler 225B which forms trench. The ILD etch can be followed by DRIE which deepens the trench by removing a portion of the substrate below the edge couplers 225A and 225B. In one embodiment, the optical component in the photonic chip is tested after the trench is formed between the edge couplers 225. That is, the ILD etch and the DRIE can be performed before block 410. Then, after the optical component has been tested, at block 415, the wafer can be diced along the trench formed using the ILD etch and DRIE in order to remove the sacrificial region.

Removing the sacrificial region from the wafer optically exposes the edge coupler in the photonic chip (which was optically coupled to the testing structure) at (or near) a side surface of the photonic chip. In one embodiment, the edge coupler may be recessed slightly from the side surface (e.g., less than five microns) when the sacrificial region is removed.

In later processing embodiments, after the edge coupler is optically exposed at the side surface (which is perpendicular or substantially perpendicular (e.g., within 10 degrees offset) to the top surface 210 shown in FIG. 2) and the photonic chips have been separated, the edge coupler is aligned to an external optical device such as a laser source or optical fiber (or other type of waveguide structure). As used herein, "optically exposed" means the edge coupler is physically exposed at the side surface or is slightly recessed from the side surface (e.g., 1-5 microns) but can nonetheless optically couple to an external optical device. However, the photonic chips that failed the test or tests performed at block 410 may be discarded, thereby saving the cost of having to package these chips. After the functional chips are packaged, additional tests may be performed to ensure the optical components in the photonic chips are still functioning correctly—e.g., within predefined limits.

FIGS. 5A and 5B illustrate a testing structure in a sacrificial region of a wafer 200, according to one embodiment disclosed herein. FIG. 5A illustrates a top view of the wafer 200 while FIG. 5B illustrates a cross-sectional side view of the wafer 200. In FIG. 5A, the testing structure in the sacrificial region 230 includes the edge coupler 225B, the waveguide 220B, and the grating coupler 240. For simplicity, only the edge coupler 225A and the waveguide 220A are shown in the photonic chip 205. In this example, the edge couplers 225A and 225B are separate by a distance (D). That is, the edge couplers 225 do not directly contact each other but instead are separated by a dielectric material—e.g., silicon dioxide. In one embodiment, the distance D is between 10 microns to 40 microns and has a coupling loss of less than 0.5 dB.

Although shown as being separate, in one embodiment, the edge couplers may be contacting. For example, instead of two edge couplers 225, the wafer may include a single, elongated edge coupler that extends between the waveguides 220A and 220B. The sacrificial region 230 can be removed from the photonic chip 205 by dicing through the middle of the elongated edge coupler. The portion of the edge coupler in the photonic chip 205 (which is now optically exposed on a side surface) can then be coupled to an external optical device when packaging the photonic chip 205.

As shown in FIG. 5B, during testing, an optical probe 500 is disposed over the grating coupler 240 in order to transmit optical signals into, or receive optical signals from, the grating coupler 240. In one embodiment, the optical probe is offset relative from the top surface of the wafer. For example, the optical probe may have an offset angle θ of twenty degrees relative to a direction that is perpendicular to the plane formed by the top surface 210 of the wafer 200. Moreover, the grating coupler 240 includes a plurality of ridges 505 that extend in a direction parallel to the top surface 210. As the light emitted by the optical probe 500 strikes the ridges 505, the light is reflected into the waveguide 220B. Stated differently, the ridges 505 redirect the light into the waveguide 220B. Conversely, the ridges 505 can redirect the light received from the waveguide 220B up through the top surface 210 at the angle θ into the optical probe 500. Although in FIG. 5B, the grating coupler 240 is recessed from the top surface 210, in another embodiment, the grating coupler 240 is physically exposed at the top surface 210. Thus, the grating coupler 240 can be optically exposed at the top surface 210 by being slightly recessed from the top surface 210 or by being physically exposed at the top surface 210.

In one embodiment, when dicing the wafer, the photonic chip 205 and the testing structure are separated along the dotted line shown in FIG. 5B. That is, the dotted line illustrates the location of the side surface of the photonic chip 205 after the sacrificial region 230 has been removed using a saw or DRIE.

FIGS. 6A and 6B illustrate a testing structure 600 in the sacrificial region 230 of the wafer 200, according to one embodiment disclosed herein. FIG. 6A illustrates a top view of the wafer 200 which includes the testing structure 600 while FIG. 6B illustrates a cross-sectional side view of the wafer 200. Like in FIGS. 5A and 5B, the testing structure 600 includes the edge coupler 225B, the waveguide 220B, and the grating coupler 240. However, the testing structure 600 also includes an optical tap 605 formed using the waveguide 610 which is coupled to a photodiode 615 and the electrical contact pads 620.

The optical tap 605 is a structure formed from the waveguide 220B and the waveguide 610 where a portion of the optical signal propagating through the waveguide 220B is transferred into the waveguide 610. For example, the waveguides 220B and 610 can be tapered in order to create the optical tap 605 but they do not need to be. The light transferred into the waveguide 610 is detected by the photodiode 615 which converts the optical signal into an electrical signal. The photodiode 615 is coupled to the electrical contact pads 620 such that a voltage or current generated by the photodiode 615 can be measured by external electrical probes. During testing, a technician may place electrical probes on the electrical contact pads 620 to measure a current generated by the photodiode 615 which corresponds to the optical signal in the waveguide 610 and is proportional to the optical power in the waveguide 220B. By monitoring the electrical signals generated by the photodiode 615, the technician can determine the characteristics of the optical signal—e.g., attenuation, amplitude, frequency, etc. With this information, the technician can determine if an optical component in the photonic chip 205 is functioning properly.

The optical tap 605 can receive signals that are transmitted from the edge coupler 225B to the grating coupler 240. However, in another embodiment, the optical tap 605 can be rearranged to receive signals transmitted from the grating coupler to the edge coupler 225B. In still another example, the testing structure 600 may include two optical taps 605 along the waveguide 220B in order to detect optical signals going either direction.

FIG. 7 illustrates a top view of the wafer 200 with multiple testing structures 705 optically coupled to the photonic chip 205, according to one embodiment disclosed herein. As shown, the photonic chip 205 is sandwiched between two sacrificial regions 230. That is, the sacrificial regions 230 are disposed at opposite sides of the photonic chip 205. However, the sacrificial regions 230 can be disposed on any two sides of the photonic chip 205. For example, the sacrificial region 230A can be disposed on a left side of the photonic chip 205 as shown while the sacrificial region 230B is disposed on the top or bottom side of the photonic chip 205.

Regardless of the sides on which the sacrificial regions 230 are disposed, the testing structures 705 form an optical path for testing a device under test (DUT) 700 in the photonic chip 205. The testing structures 705 may be the testing structure 235 shown in FIG. 2 or the testing structure 600 in FIG. 6. In any case, a technician can use a first optical probe to transmit an optical signal into the testing structure 705A which is then transferred into the edge coupler 225D and the DUT 700. The DUT 700 (e.g., an optical component) generates an output optical signal that is transmitted to the edge coupler 225E and to the testing structure 705B in the sacrificial region 230B. The testing structure 705B can transmit the optical signal to a second optical probe. In one embodiment, the first and second optical probes are coupled to the same testing apparatus which can compare the optical signal transmitted on the first optical probe to the optical signal received on the second optical probe to determine if the DUT 700 is functioning properly. In this manner, multiple testing structures 705 can be disposed in different sacrificial regions 230 to form an optical path through the photonic chip 205.

FIG. 8 illustrates the wafer 200 with photonic chips 205 that are optically cascaded, according to one embodiment disclosed herein. In this example, the wafer 200 includes two photonic chips 205A and 205B which are optically coupled using respective edge couplers 225. That is, the edge coupler 225E in the photonic chip 205C is arranged in the wafer 200 to be optically coupled to the edge coupler 225F in the photonic chip 205D. As such, optical signals can be transferred between the photonic chips 205 while still integrated into the wafer 200.

Instead of using the testing structures 705 to test an optical component in one of the photonic chip, in FIG. 8 the testing structures 705 establish an optical path for testing optical components in multiple photonic chips 205. As shown, the testing structure 705A is optically coupled to the edge coupler 225D in the photonic chip 205D. Thus, the technician can introduce an optical signal into the testing structure 705A which then is transmitted through the DUT 700A and into the DUT 700B in the photonic chip 205D. The output of the DUT 700B is received at the testing structure 705B via the edge coupler 225G. As above, the optical probes used to transmit and receive the optical signals via the testing structures 705 can be coupled to a testing apparatus to determine the functionality of the photonic chips 205.

The testing arrangement shown in FIG. 8 may be preferred since fewer sacrificial regions 230 may be needed in the wafer 200 which means more area can be used for the photonic chips 200. However, this arrangement may mean the technician cannot tell which of the photonic chips 205 is non-functional if the output signal is not within a predefined tolerance. Put differently, the technician may label both of the photonic chips 205C and 205D as being non-functional even though only one of the chips 205 may have a defect.

Although FIG. 8 illustrates cascading two photonic chips, any number of chips 205 may be interconnected between two testing structures 705. For example, the wafer 200 may include testing structures 705 only at the edges of the wafer 200 rather than between the photonic chips. All the photonic chips 205 in a particular row or column in the wafer 200 can be optically connected using edge couplers between two testing structures 705 as shown in FIG. 8. Alternatively, photonic chips 205 in multiple rows may be interconnected. For example, three photonic chips in a first row may be interconnected as shown in FIG. 8, but instead of the third chip in the first row being connected to the testing structure 705B, this chip is coupled using an edge coupler to a photonic chip in a second, neighboring row which can then be coupled to the testing structure 705B or to additional photonic chips in the second row. In any case, the two photonic chips at the ends of the cascade of photonic chips are coupled to the testing structures 705 to form an optical path through the chips.

Figure 9:
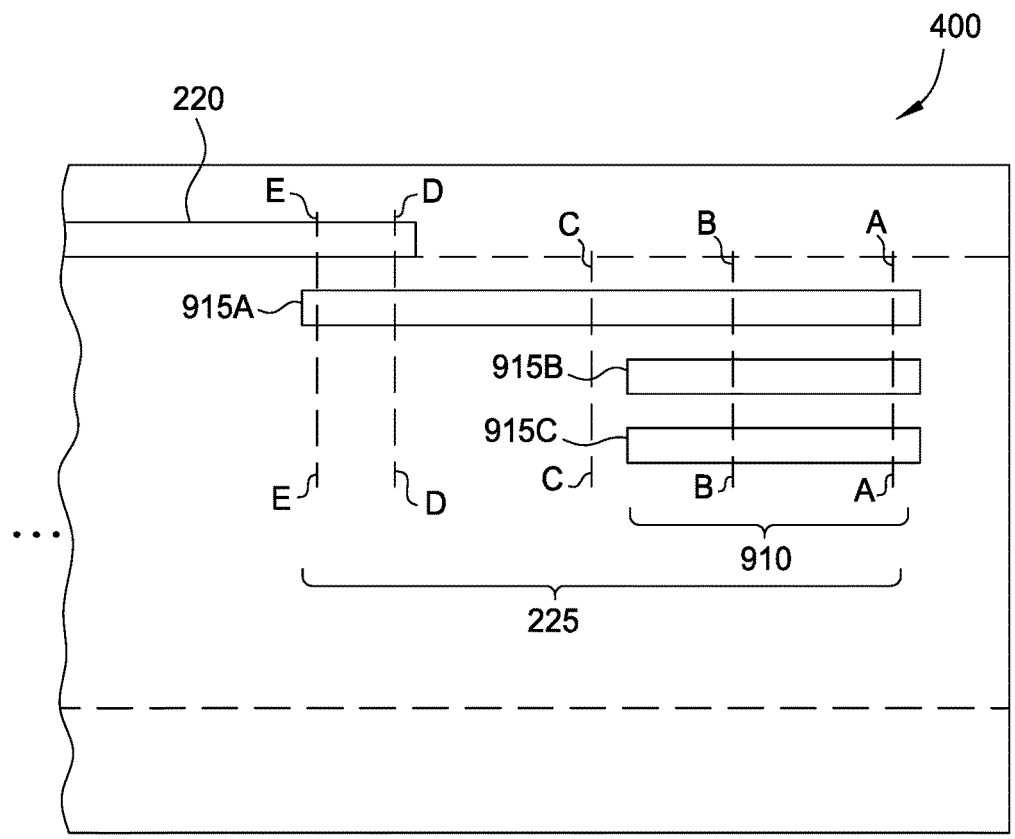
FIG. 9 illustrates an edge coupler, according to one embodiment disclosed herein.

FIG. 9 illustrates an edge coupler 225, according to one embodiment disclosed herein. FIG. 9 illustrates a side view of a photonic chip or a testing structure that includes an edge coupler 225 formed using a multi-prong, embedded structure. Here, a silicon waveguide 220 is formed above the edge coupler 225 (e.g., the edge coupler 225 may be embedded in the insulation layer 110 illustrated in FIG. 1). However, in another embodiment, the multi-prong structure may be flipped relative to the waveguide 220 such that the prongs of the edge coupler 225 are formed in layers above the silicon waveguide 220 (i.e., the silicon waveguide 220 is between the prongs of the edge coupler 225 and the insulation layer 110 of the SOI device). Although not shown, the silicon waveguide 220 couples an optical signal between one or more optical components and the edge coupler 225.

The edge coupler 225 includes a waveguide adapter 910 which can be optically coupled to another edge coupler (before the wafer has been diced) or to an external optical device (after the wafer has been separated). The edge coupler 225 is made of separate prongs 915 that may include the same material (e.g., silicon nitride or silicon oxy-nitride) embedded in an insulative material (e.g., silicon dioxide or silicon oxy-nitride). In one embodiment, the material of the prongs 915 and the edge coupler 225 may be different from the material of layer 110 shown in FIG. 1. Generally, the edge coupler 225 may be made of any material with a higher refractive index than the material of the insulative material surrounding the prongs 915.

Figure 10A:
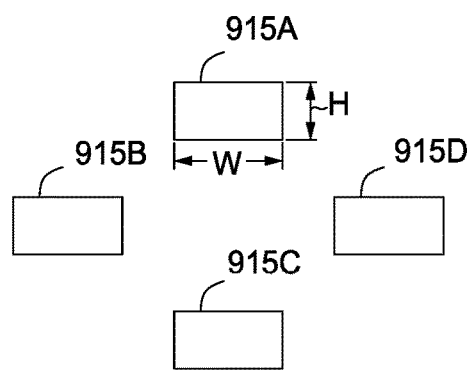

FIGS. 10A-10E illustrate cross-sectional views of the photonic chip or testing structure with the multi-prong edge coupler 225, according to embodiments disclosed herein. Specifically, FIG. 10A illustrates the cross section A-A of a portion of the waveguide adapter 910 that is closest to a neighboring edge coupler (or a coupling interface if the wafer has already been diced). Here, the waveguide adapter 910 includes four separate prongs 915A-D that may have the same or similar width (W) and height (H) (or thickness) dimensions. These dimensions, as well as the spacing between the prongs 915A-D may vary depending on the specific application. In the example shown, the waveguide adapter 910 may be configured to interface with a single mode optical fiber with a 10 micron core. As will be appreciated by one of ordinary skill in the art, these dimensions may vary depending on the specific application. Specifically, the dimensions may be chosen such that the mode of the prong at the coupling interface substantially matches the mode of the external device to which light is to be coupled to or from. Here, the width of the prongs 915A-D may range from approximately 200-300 nanometers with a height between 100-250 nanometers. More specifically, the width may be around 200 nanometers while the height is approximately 200 nanometers. The distance between prong 915A and prong 915C and the distance between prong 915D and prong 915B may be around two microns. As mentioned above, the dimensions, as well as the spacing, of the prongs 915 may vary according to the mode or design of the external light source coupled to the photonic chip.

Figure 10B:
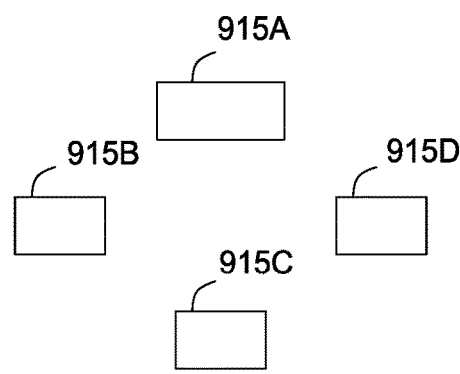

FIG. 10B illustrates the cross section B-B of the waveguide adapter 910. This figure shows that as the multi-prong adapter is recessed away from the neighboring edge coupler, the width of the prongs 915B, 915C, and 915D reduces while the width of prong 915A increases. As shown, the tapering of widths of the prongs 915B-D is done in an adiabatic fashion. The tapering results in a gradual transition of optical energy from an optical mode which is confined by all the prongs 915A-D at the right side of the waveguide adapter 910 where the widths and heights of all the prongs 915A-D are same to a mode which is gradually confined more and more in the upper prong 915A at positions farther to the left in the adapter 910. This tapering transfers the optical energy confined by prongs 915A-D to prong 915A alone. However, the opposite is also true. That is, tapering the widths also enables a signal introduced in the upper prong 915A to be transferred to a mode confined by prongs 915A-D as the optical signal propagates from left to right. The widths of the prongs 915A-D may change continuously (e.g., a linear or non-linear fashion such as exponentially or at higher order polynomial profiles) or at discrete increments as the waveguide adapter 910 extends from right to left. As shown in FIG. 9, eventually the prongs 915B-D terminate (which ends the waveguide adapter 910) while prong 915A continues to transmit the optical signal. In one embodiment, the waveguide adapter 910 may have a length of approximately 100 microns. Furthermore, the waveguide adapter 910 may taper for all of this length or for only a portion thereof. For example, the widths of the prongs 915A-D may remain substantially equivalent for the first five to ten microns before the widths of prongs 915A-D begin to change.

FIG. 10C illustrates the cross section C-C of the edge coupler 225. Here, the waveguide adapter 910 has terminated which leaves only prong 915A to carry the optical signal. Although shown as being linear, prong 915A may bend or twist to carry the optical signal to different areas of the photonic chip or testing structure. Thus, the length of prong 915A may be much larger than the lengths of prongs 915B-D to enable prong 915A to carry an optical signal to different areas.

FIG. 10D illustrates the cross section D-D of the edge coupler 225 and silicon waveguide 220. As shown, the width of prong 915A is larger than the width of the silicon waveguide 220. Moreover, the distance between prong 915A and the waveguide 220 may range from hundreds of nanometers to only a few nanometers depending on the techniques used to fabricate the wafer. Depending on the technique used to fabricate the wafer, a portion of prong 915A may directly contact waveguide 220.

FIG. 10E illustrates the cross section E-E of the edge coupler 225 and silicon waveguide 220. Here, the width of prong 915A has shrunk while the width of the waveguide 220 has increased. This tapering, which is again shown in an adiabatic fashion, results in the optical signal in prong 915A to transfer to waveguide 220 and vice versa with minimal loss. Eventually, prong 915A terminates and waveguide 220 may carry the optical signal to different optical components, e.g., optical components in the photonic chip or a grating coupler in the testing structure.

Although the embodiments above discuss tapering the prongs 915A-D by changing the width, a similar transfer of optical power may occur if the heights are tapered, or some combination of both. However, tapering the height of the prongs 915A-D may require different lithography and fabrication techniques or materials than tapering the widths as shown in FIGS. 10A-10E. It is also not necessary that the widths of all the prongs are tapered. For example, in certain designs the required transfer of optical energy can be obtained by just tapering the width of 915A alone while the widths of prongs 915B-D are not tapered.

FIGS. 11A-11B illustrate a partially overlapping, inverse-taper waveguide structure for transferring an optical signal between waveguides, according to embodiments disclosed herein. As shown, FIG. 11A illustrates a plan view of a first tapered waveguide 1105 partially overlapping a second tapered waveguide 1110. Specifically, FIG. 11A may be the arrangement of the portion of a photonic chip or testing structure in FIG. 9 where waveguide 220 overlaps prong 915A. The tapering of the waveguides is done adiabatically to minimize optical loss. Although FIGS. 11A and 11B illustrate that the widths of the tapers vary linearly, the waveguides can also taper in a non-linear fashion for example exponential or some higher order polynomial profile as long as the adiabatic criterion is satisfied. In one embodiment, the distance between the first and second waveguides 1105 and 1110 is less than a micron. For example, the waveguides 1105, 1110 may be separated by 100 nanometers or less. The separation distance may affect the efficiency with which an optical signal may transfer between the waveguides 1105 and 1110, and thus, a structure may be designed such that the waveguides 1105 and 1110 are as close as fabrication techniques allow.

FIG. 11B illustrates a top view of waveguides 1105 and 1110. By at least partially overlapping the waveguides 1105, 1110, an optical signal may be transferred between waveguide in different layers in the wafer. In one embodiment, the waveguides 1105, 1110 only partially overlap where their respective ends begin to taper. The slope or change of the taper may depend on the material used for forming the waveguides 1105, 1110. In one embodiment, at the widest point, the waveguides 1105, 1110 may have a width that ranges from 200 nanometers to 2 microns. At the narrowest point, the waveguides 1105, 1110 may have a width from 100 nanometers to 200 nanometers. The length of the tapering portion may range from 10 microns to 50 microns—e.g., around 20 microns.

Figure 12:
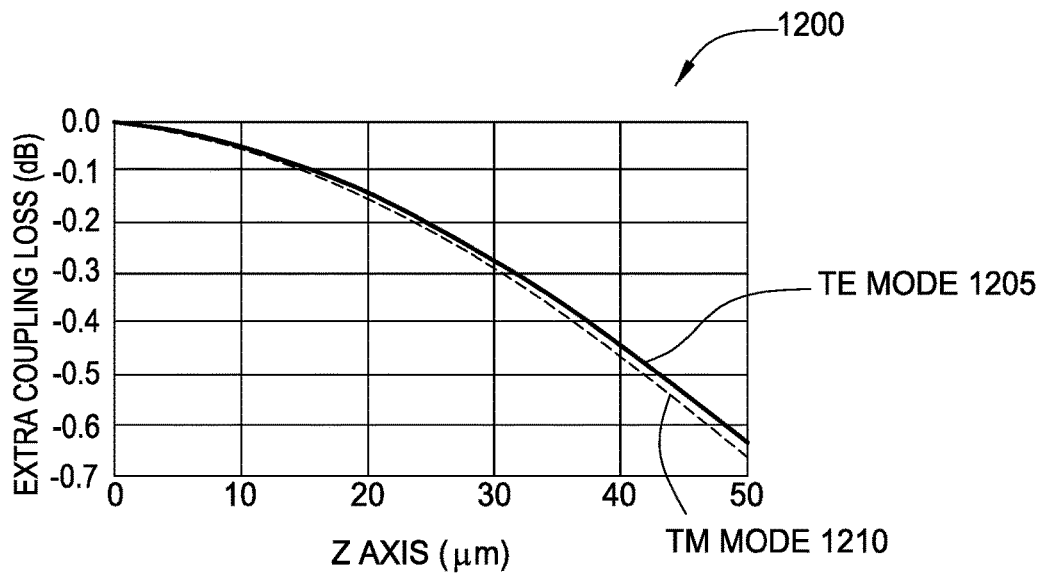
FIGS. 12-14 illustrate simulation results for optically coupling an edge coupler in a photonic chip to an edge coupler in a testing structure, according to one embodiment disclosed herein.
Figure 13:
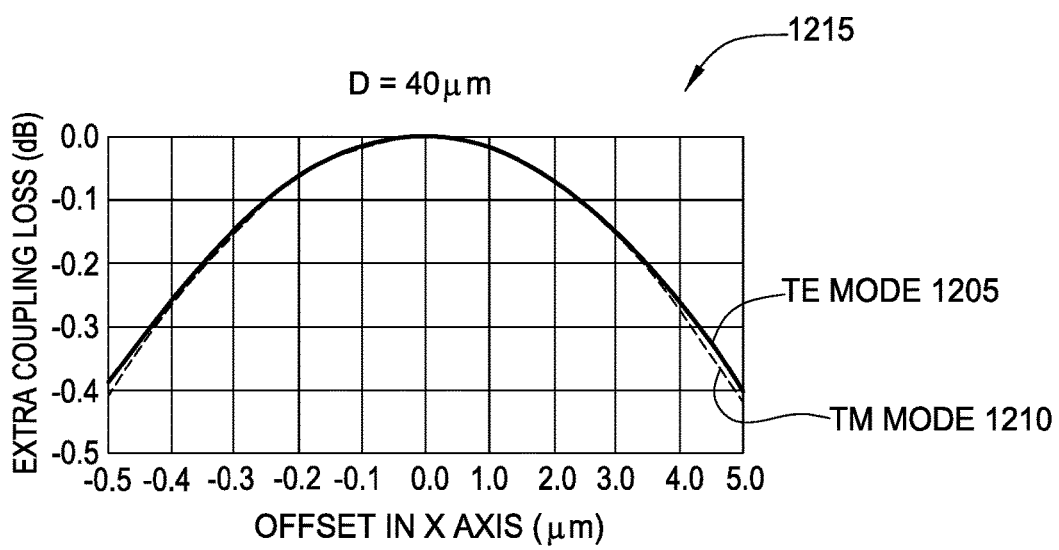
Figure 14:
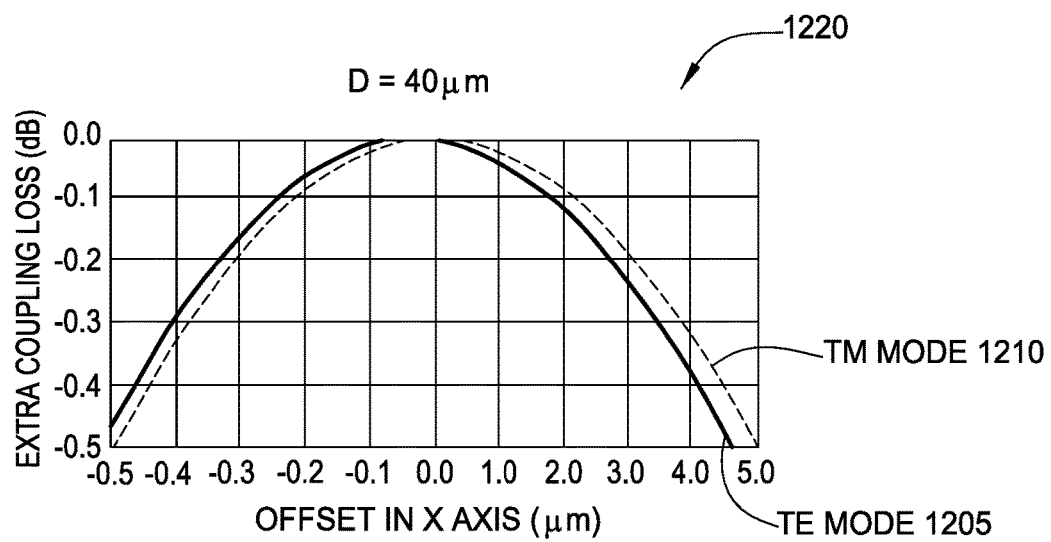

FIGS. 12-14 illustrate simulation results for optically coupling an edge coupler in a photonic chip to an edge coupler in a testing structure, according to one embodiment disclosed herein. The edge couplers used for the simulation results corresponds to the multi-prong adapter 910 shown in FIG. 9 which are arranged as shown by the edge coupler 225A and the edge coupler 225B in FIGS. 5A and 5B.

FIG. 12 is a chart 1200 that illustrates the coupling loss between the two edge couplers 225. Specifically, the chart 1200 illustrates the coupling loss when the optical signal transmitted between the edge couplers 225 is the transverse electric (TE) mode 1205 and the transverse magnetic (TM) mode 1210. The Z axis is parallel with the distance (D) labeled in FIG. 5A. Chart 1200 illustrates that as the separation distance D increases along the Z axis, the coupling loss increases. However, the loss is essentially the same regardless of whether the optical signal has the TE mode 1205 or the TM mode 1210.

A separation distance of 40 microns provides sufficient room to dice the area between the edge couplers in order to separate the testing structure from the photonic chip and results in less than a 0.5 dB coupling loss between the edge couplers. Of course, the coupling loss can be decreased by reducing the separation distance, but this increases the likelihood that the edge coupler in the photonic chip is damaged when dicing the wafer. In one embodiment, the edge couplers are separated by a distance of at least 10 microns. In another embodiment, the edge couplers are separated by a distance of at least 20 microns. In another embodiment, the edge couplers are separated by a distance of at least 40 microns.

FIG. 13 is a chart 1215 that illustrates the coupling loss between the two edge couplers 225 in the X axis—i.e., the direction into and out of the page in FIG. 5A. Again, the coupling loss is essentially the same regardless of whether the optical signal has the TE mode 1205 or the TM mode 1210.

FIG. 14 is a chart 1220 that illustrates the coupling loss between the two edge couplers 225 in the Y axis—i.e., the vertical direction in FIG. 5A.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:
1. A method, comprising:
providing a first testing structure in a sacrificial region of a wafer, wherein the wafer comprises a plurality of photonic chips, and wherein the first testing structure comprises a first edge coupler optically coupled to a second edge coupler in a first photonic chip of the plurality of photonic chips;
testing a first optical component in the first photonic chip using a first grating coupler in the first testing structure by transmitting a first optical signal between a first optical probe and the first optical component using the first grating coupler and the first and second edge couplers, wherein the first and second edge couplers each comprises at least one tapered waveguide configured to adjust a diameter of a mode of the first optical signal; and removing the sacrificial region from the wafer such that the second edge coupler is optically exposed at a side surface of the first photonic chip.

2. The method of claim 1, further comprising:
dicing the wafer to form individual photonic chips that include the first photonic chip.

3. The method of claim 1, wherein testing the first optical component comprises:
transmitting the first optical signal from the first optical probe into the first grating coupler through a top surface of the wafer, wherein the first grating coupler redirects the first optical signal into a waveguide extending in a direction parallel with the top surface, wherein the waveguide couples the first grating coupler to the first edge coupler, and wherein the top surface is substantially perpendicular to the side surface.

4. The method of claim 3, wherein testing the first optical component comprises:
receiving a second optical signal at a second testing structure using a second optical probe, wherein the second optical signal is outputted by the first optical component in response to the first optical signal, and wherein the second testing structure comprises a second grating coupler and a third edge coupler, wherein the third edge coupler is optically coupled to a fourth edge coupler in the first photonic chip;
determining if the first photonic chip is functional by comparing the first optical signal to the second optical signal; and
removing the second testing structure from the wafer using at least one of a saw and an etching process.

5. The method of claim 3, wherein testing the first optical component comprises:
receiving a second optical signal at a second photonic chip of the plurality of photonic chips, wherein the second optical signal is outputted by the first optical component in response to the first optical signal;
receiving a third optical signal at a second testing structure using a second optical probe, wherein the third optical signal is outputted by a second optical component in the second photonic chip in response to the second optical signal, and wherein the second testing structure comprises a second grating coupler and a third edge coupler, wherein the third edge coupler is optically coupled to a fourth edge coupler in the second photonic chip;
determining if the first photonic chip and the second photonic chip are functional by comparing the first optical signal to the third optical signal; and
removing the second testing structure from the wafer using at least one of a saw and an etching process.

6. The method of claim 1, further comprising, after removing the sacrificial region:
aligning an external optical device to the second edge coupler at the side surface when packaging the first photonic chip.

7. The method of claim 1, wherein the first and second edge couplers each comprises a multi-prong structure disposed on different layers, wherein each layer is separated by a dielectric material.

8. The method of claim 1, wherein the first and second edge couplers are separated by a distance of at least 10 microns.

9. A semiconductor wafer, comprising:
a sacrificial region comprising a first testing structure, wherein the first testing structure comprises a first edge coupler optically coupled to a first grating coupler configured to permit an optical signal to be at least one of transmitted to and received from an optical probe;
a plurality of photonic chips integrated into the wafer, wherein a first photonic chip of the plurality of photonic chips includes a second edge coupler and a first optical component, wherein the first optical component, the first edge coupler, the second edge coupler, and the first grating coupler are optically coupled together such that the optical signal tests a functionality of the first optical component,
wherein the second edge coupler is arranged in the first photonic chip such that the second edge coupler is optically exposed on a side surface of the first photonic chip after the first photonic chip has been separated from the other photonic chips in the wafer and the sacrificial region;
a second testing structure in the sacrificial region comprising a second grating coupler and a third edge coupler, wherein the third edge coupler is optically coupled to a fourth edge coupler in a second photonic chip of the plurality of photonic chips, wherein the fourth edge coupler is optically coupled to a second optical component in the second photonic chip, wherein the second optical component in the second photonic chip is optically coupled to a sixth edge coupler in the second photonic chip, wherein the sixth edge coupler is optically coupled to a seventh edge coupler in the first photonic chip, and wherein the seventh edge coupler is optically coupled to the first optical component; and
an optical path between the first and second testing structures, the optical path comprising the first and second optical components in the first and second photonic chips and is configured for testing the functionality of the first and second optical components.

10. The semiconductor wafer of claim 9, wherein the first grating coupler is optically exposed at a top surface of the wafer, wherein the first grating coupler redirects the optical signal into a waveguide extending in a direction parallel with the top surface, wherein the waveguide couples the first grating coupler to the first edge coupler, and wherein the top surface is substantially perpendicular to the side surface.

11. The semiconductor wafer of claim 9, wherein the third edge coupler is optically coupled to the fourth edge coupler in the first photonic chip, wherein the fourth edge coupler is optically coupled to the first optical component.

12. The semiconductor wafer of claim 9, wherein the first and second edge couplers each comprises at least one tapered waveguide configured to adjust a diameter of a mode of the optical signal.

13. The semiconductor wafer of claim 9, wherein the first and second edge couplers each comprises a multi-prong structure disposed on different layers, wherein each layer is separated by a dielectric material.

14. The semiconductor wafer of claim 9, wherein the first and second edge couplers are separated by a distance of at least 10 microns.

15. The semiconductor wafer of claim 14, wherein the first and second edge couplers are separated by a distance of at least 40 microns.

16. A method, comprising:
  providing a first testing structure in a sacrificial region of a wafer, wherein the wafer comprises a plurality of photonic chips, wherein the first testing structure comprises a first grating coupler, and wherein a first photonic chip of the plurality of photonic chips comprises a first edge coupler optically coupled to a first optical component in the first photonic chip and the first grating coupler;
  testing, while the first photonic chip is part of the wafer, the first optical component using the first grating coupler in the first testing structure by transmitting a first optical signal between a first optical probe and the first optical component using the first grating coupler and the first edge coupler, wherein the first edge coupler comprises a multi-prong structure disposed on different layers, wherein each layer is separated by a dielectric material; and
  removing the sacrificial region from the wafer such that the first edge coupler is optically exposed at a side surface of the first photonic chip.

17. The method of claim 16, wherein testing the first optical component comprises:
  transmitting the first optical signal from the first optical probe into the first grating coupler through a top surface of the wafer, wherein the first grating coupler redirects the first optical signal into a waveguide extending in a direction parallel with the top surface, wherein the waveguide couples the first grating coupler to the first edge coupler, and wherein the top surface is substantially perpendicular to the side surface.

18. The method of claim 17, wherein testing the first optical component comprises:
  receiving a second optical signal at a second testing structure using a second optical probe, wherein the second optical signal is outputted by the first optical component in response to the first optical signal, and wherein the second testing structure comprises a second grating coupler optically coupled to a second edge coupler in the first photonic chip, and wherein the second edge coupler is optically coupled to the first optical component;
  determining if the first photonic chip is functional by comparing the first optical signal to the second optical signal; and
  removing the second testing structure from the wafer using at least one of a saw and an etching process.

19. A method, comprising:
  providing a first testing structure in a sacrificial region of a wafer, wherein the wafer comprises a plurality of photonic chips, and wherein the first testing structure comprises a first edge coupler optically coupled to a second edge coupler in a first photonic chip of the plurality of photonic chips;
  testing a first optical component in the first photonic chip using a first grating coupler in the first testing structure by transmitting a first optical signal between a first optical probe and the first optical component using the first grating coupler and the first and second edge couplers, wherein testing the first optical component comprises:
    transmitting the first optical signal from the first optical probe into the first grating coupler through a top surface of the wafer, wherein the first grating coupler redirects the first optical signal into a waveguide extending in a direction parallel with the top surface, wherein the waveguide couples the first grating coupler to the first edge coupler, and wherein the top surface is substantially perpendicular to a side surface;
    receiving a second optical signal at a second photonic chip of the plurality of photonic chips, wherein the second optical signal is outputted by the first optical component in response to the first optical signal;
    receiving a third optical signal at a second testing structure using a second optical probe, wherein the third optical signal is outputted by a second optical component in the second photonic chip in response to the second optical signal, and wherein the second testing structure comprises a second grating coupler and a third edge coupler, wherein the third edge coupler is optically coupled to a fourth edge coupler in the second photonic chip;
    determining if the first photonic chip and the second photonic chip are functional by comparing the first optical signal to the third optical signal; and
    removing the second testing structure from the wafer using at least one of a saw and an etching process; and
  removing the sacrificial region from the wafer such that the second edge coupler is optically exposed at the side surface of the first photonic chip.

* * * * *

UNITED STATES PATENT AND TRADEMARK OFFICE
CERTIFICATE OF CORRECTION

PATENT NO. : 10,145,758 B2
APPLICATION NO. : 15/582306
DATED : December 4, 2018
INVENTOR(S) : Matthew J. Traverso et al.

It is certified that error appears in the above-identified patent and that said Letters Patent is hereby corrected as shown below:

On the Title Page

Item (72), in Column 1, in "Inventors", Line 2, delete "Breiningsville," and insert -- Breinigsville, --, therefor.

Signed and Sealed this
Fifth Day of March, 2019

Andrei Iancu
*Director of the United States Patent and Trademark Office*